United States Patent
Berke

(10) Patent No.: US 12,554,637 B2
(45) Date of Patent: *Feb. 17, 2026

(54) RUNTIME DE-INTERLEAVE AND RE-INTERLEAVE OF SYSTEM MEMORY

(71) Applicant: DELL PRODUCTS L.P., Round Rock, TX (US)

(72) Inventor: Stuart Allen Berke, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 14 days.

This patent is subject to a terminal disclaimer.

(21) Appl. No.: 18/600,340

(22) Filed: Mar. 8, 2024

(65) Prior Publication Data

US 2024/0211396 A1    Jun. 27, 2024

Related U.S. Application Data

(63) Continuation of application No. 17/875,135, filed on Jul. 27, 2022, now Pat. No. 12,001,332.

(51) Int. Cl.
*G06F 12/06* (2006.01)
*G06F 13/16* (2006.01)

(52) U.S. Cl.
CPC ...... *G06F 12/0607* (2013.01); *G06F 12/0646* (2013.01); *G06F 13/1668* (2013.01)

(58) Field of Classification Search
CPC ............. G06F 12/0607; G06F 12/0646; G06F 13/1668
See application file for complete search history.

(56) References Cited

U.S. PATENT DOCUMENTS

| | | | |
|---|---|---|---|
| 8,352,834 B2 | 1/2013 | Liu et al. | |
| 10,484,136 B2 | 11/2019 | Bhat et al. | |
| 2005/0246508 A1* | 11/2005 | Shaw | G06F 12/0607 711/E12.079 |
| 2009/0300299 A1 | 12/2009 | Saxe et al. | |
| 2010/0011162 A1* | 1/2010 | Wang | G06F 3/0607 711/E12.001 |
| 2015/0278109 A1* | 10/2015 | Vahidsafa | G06F 11/141 711/206 |
| 2017/0162235 A1 | 6/2017 | De et al. | |

OTHER PUBLICATIONS

McKennon, Justin. "CUDA Host/Device Transfers and Data Movement". Pub Jun. 24, 2013. <https://www.microway.com/hpc-tech-tips/cuda-host-to-device-transfers-and-data-movement/>. (Year: 2013).

* cited by examiner

*Primary Examiner* — Kenneth M Lo
(74) *Attorney, Agent, or Firm* — Larson Newman, LLP

(57) ABSTRACT

An information handling system includes a first memory device that provides a first system physical address (SPA) space for the information handling system having a first capacity. Data is stored on the first memory device with a first interleave configuration. A second memory device provides a second SPA space for the information handling system that has a second capacity that is greater than or equal to the first capacity. Without rebooting the information handling system and without halting a process, the system de-interleaves the data stored on the first memory device, stores the data on the second memory device, and re-interleaves the data.

20 Claims, 5 Drawing Sheets

4-Way Interleave

RUNTIME DE-INTERLEAVE AND RE-INTERLEAVE OF SYSTEM MEMORY

CROSS-REFERENCE TO RELATED APPLICATION

This application is a Continuation of U.S. patent application Ser. No. 17/875,135 entitled "RUNTIME DE-INTERLEAVE AND RE-INTERLEAVE OF SYSTEM MEMORY" filed Jul. 27, 2022, the disclosure of which is hereby expressly incorporated by reference in its entirety.

FIELD OF THE DISCLOSURE

This disclosure generally relates to information handling systems, and more particularly relates to providing for the run time de-interleaving and re-interleaving of system memory in an information handling system.

BACKGROUND

As the value and use of information continues to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An information handling system may include a first memory device that provides a first system physical address (SPA) space for the information handling system having a first capacity. Data may be stored on the first memory device with a first interleave configuration. A second memory device may provide a second SPA space for the information handling system that has a second capacity that is greater than or equal to the first capacity. Without rebooting the information handling system and without halting a process, the system may de-interleave the data stored on the first memory device, store the data on the second memory device, and re-interleave the data.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF DRAWINGS

The following description in combination with the Figures is provided to assist in understanding the teachings disclosed herein. The following discussion will focus on specific implementations and embodiments of the teachings. This focus is provided to assist in describing the teachings, and should not be interpreted as a limitation on the scope or applicability of the teachings. However, other teachings can certainly be used in this application. The teachings can also be used in other applications, and with several different types of architectures, such as distributed computing architectures, client/server architectures, or middleware server architectures and associated resources.

Figure 1:
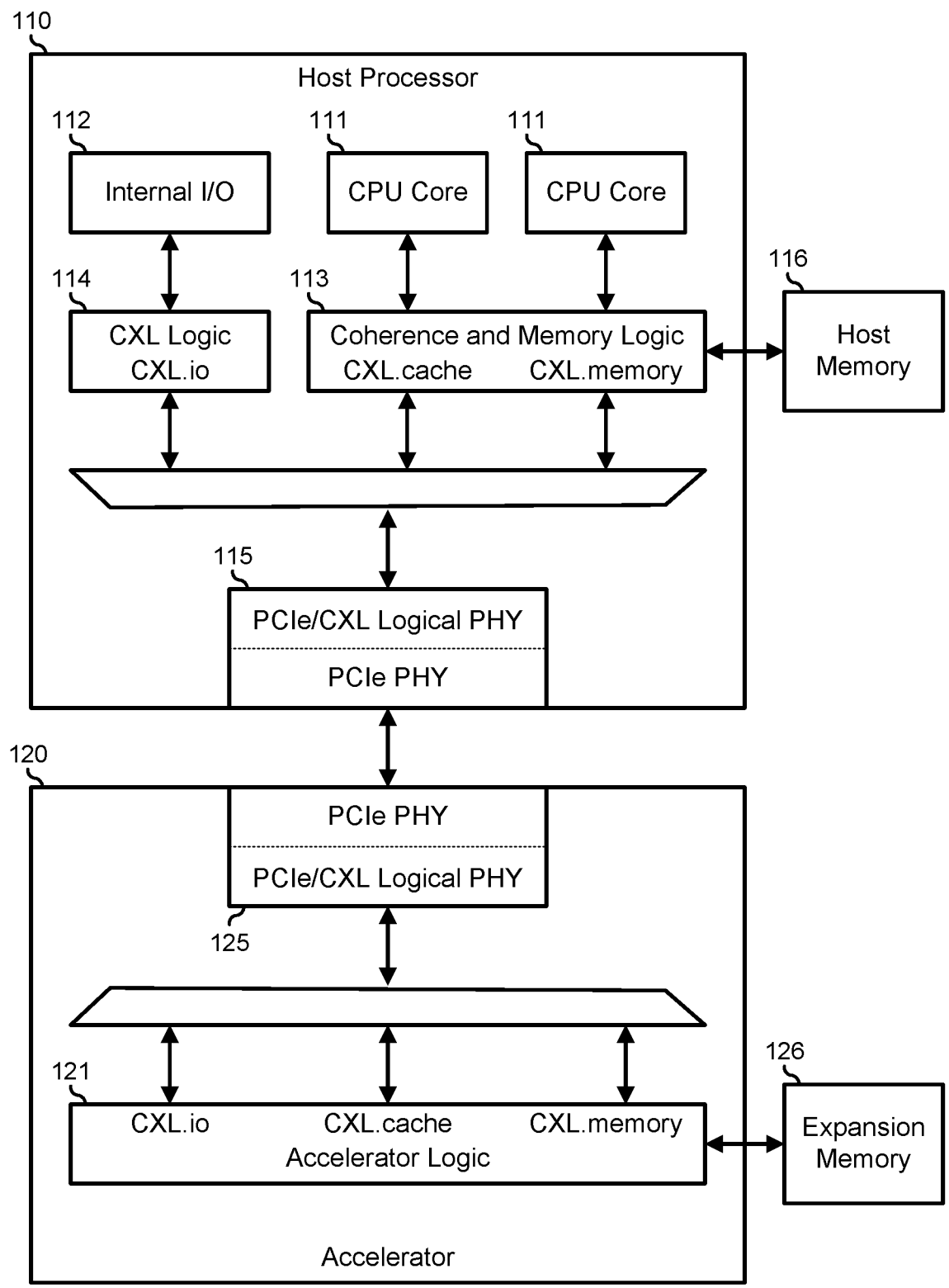
FIG. 1 is a block diagram of a compute express link (CXL) information handling system according to an embodiment of the current disclosure.

FIG. 1 shows an information handling system 100, including a host processor 110 with associated host memory 116, and an accelerator device 120 with associated expansion memory 126. Host processor 110 includes one or more processor core 111, various internal input/output (I/O) devices 112, coherence and memory logic 113, compute express link (CXL) logic 114, and a PCIe physical layer (PHY) interface 115. Coherence and memory logic 113 provides cache coherent access to host memory 116. The operation of a host processor, and particularly of the component functional blocks within a host processor, are known in the art, and will not be further described herein, except as needed to illustrate the current embodiments.

Accelerator device 120 includes accelerator logic 121, and a PCIe PHY interface 125 that is connected to PCIe PHY interface 115. Accelerator logic 121 provides access to expansion memory 126. Accelerator device 120 represents a hardware device configured to enhance the overall performance of information handling system 100. An examples of accelerator device 120 may include a smart network interface card (NIC) or host bus adapter (HBA), a graphics processing unit (GPU), field programmable gate array (FPGA), or application specific integrated circuit (ASIC) device, a memory management and expansion device or the like, or another type of device configured to improve the performance of information handling system 100, as needed or desired. In particular, being coupled to host processor 110 via the PCIe link established between PCIe interfaces 115 and 125, accelerator device 120 may represent a task-based device that receives setup instructions from the host processor, and then independently executes the tasks specified by the setup instructions. In such cases, accelerator device 120 may access host memory 116 via a direct memory access (DMA) device or DMA function instantiated on the host processor. When representing a memory management device, accelerator device 120 may represent a device configured to provide an expanded memory capacity, in the form of expansion memory 126, thereby increasing the overall storage capacity of information handling system 100, or may represent a memory capacity configured to increase the memory bandwidth of the information handling system, as needed or desired.

Information handling system 100 represents an information handling system configured in conformance with a CXL standard, such as a CXL 1.1 specification, a CXL 2.0 specification, or any other CXL standard as may be published from time to time by the CXL Consortium. The CXL standard is an industry-supported interconnection standard that provides a cache-coherent interconnection between processors, accelerator devices, memory expansion devices, or other devices, as needed or desired. In this way, operations performed at diverse locations and by diverse architectures may maintain a memory coherency domain across the entire platform. The CXL standard provides for three (3) related protocols: CXL.io, CXL.cache, and CXL.memory. The CXL.io protocol represents an I/O protocol that is based upon the PCIe 5.0 protocol (for CXL specification 1.1) or the PCIe 6.0 protocol (for CXL specification 2.0).

For example, the CXL.io protocol provides for device discovery, configuration, and initialization, interrupt and DMA handling, and I/O virtualization functions, as needed or desired. The CXL.cache protocol provides for processors to maintain a cache-coherency domain with accelerator devices and their attached expansion memory, and with capacity- and bandwidth-based memory expansion devices, as needed or desired. The CXL.memory protocol permits processors and the like to access memory expansion devices in a cache-coherency domain utilizing load/store-based commands, as needed or desired. Further, the CXL.memory protocol permits the use of a wider array of memory types than may be supported by processor 110. For example, a processor may not provide native support for various types of non-volatile memory devices, such as Intel Optane Persistent Memory, but the targeted installation of an accelerator device that supports Intel Optane Persistent Memory may permit the information handling system to utilize such memory devices, as needed or desired.

In this regard, host processor 110 and accelerator device 120 each include logic and firmware configured to instantiate the CXL.io, CXL.cache, and CXL.memory protocols. In particular, within host processor 110, coherence and memory logic 113 instantiates the functions and features of the CXL.cache and CXL.memory protocols, and CXL logic 114 implements the functions and features of the CXL.io protocol. Further, PCIe PHY 115 instantiates a virtual CXL logical PHY. Likewise, within accelerator device 120, accelerator logic 121 instantiates the CXL.io, CXL.cache, and CXL.memory protocols, and PCIe PHY 125 instantiates a virtual CXL logical PHY. Within a CXL enabled accelerator device such as accelerator device 120, both the CXL.cache and CXL.memory protocols do not have to be instantiated, as needed or desired, but any CXL enabled accelerator device must instantiate the CXL.io protocol.

In a particular embodiment, the CXL standard provides for the initialization of information handling system 100 with a heavy reliance on existing PCIe device and link initialization processes. In particular, when information handling system 100 is powered on, the PCIe device enumeration process operates to identify accelerator 120 as a CXL device, and that the operations of the accelerator, in addition to providing for standard PCIe operation, functions, and features, may be understood to provide for additional CXL operation, functions, and features. For example, accelerator 120 will be understood to enable CXL features such as global memory flush, CXL reliability, availability, and serviceability (RAS) features, CXL metadata support, and the like. In addition to the enablement of the various CXL operation, functions, and features, accelerator 120 will be understood to enable operations at higher interface speeds, such as 16 giga-transfers per second (GT/s) or 32 GT/s.

Figure 2:
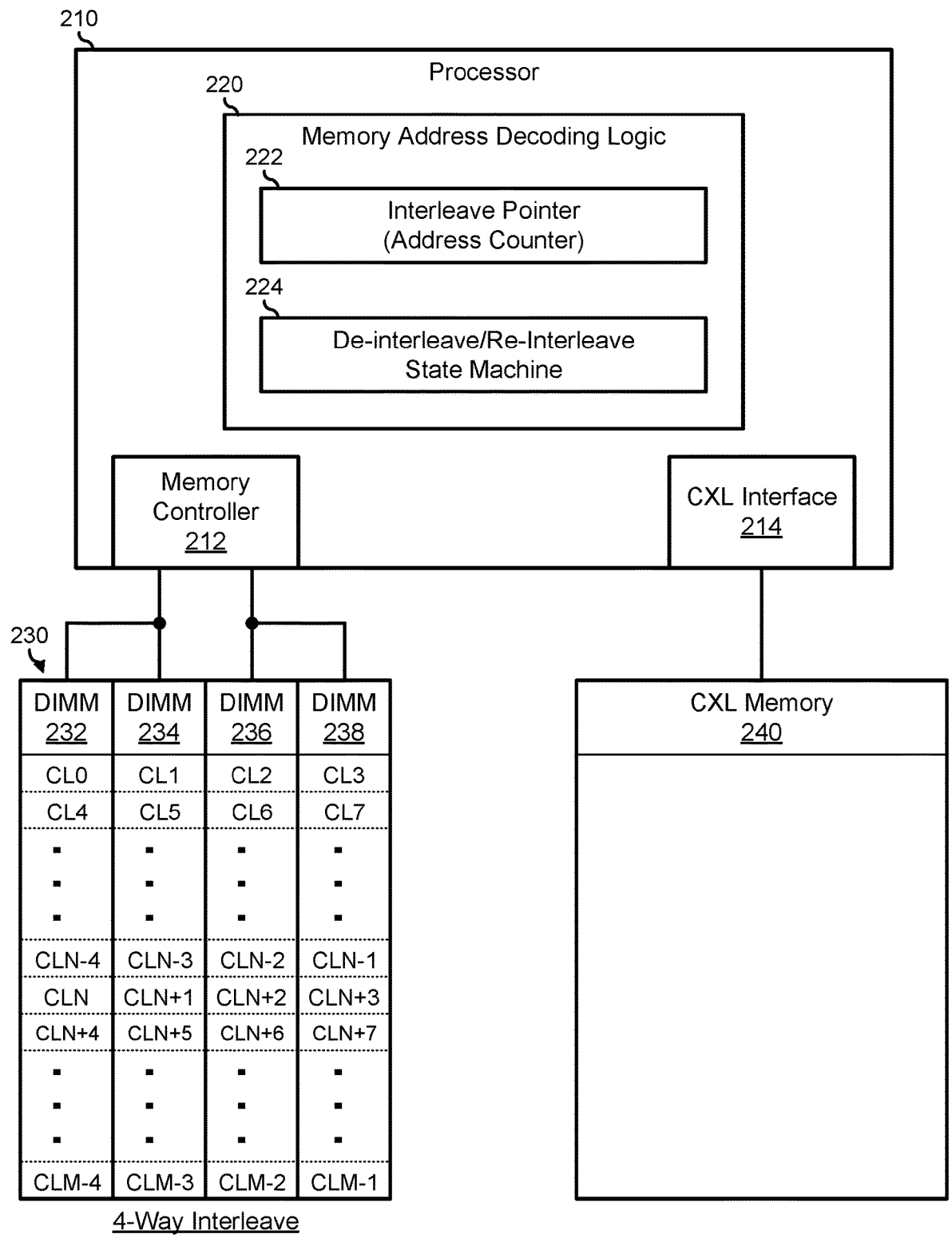
FIG. 2 is a block diagram of a CXL information handling system according to another embodiment of the current disclosure.

FIG. 2 illustrates a CXL information handling system 200 including a processor 210, a system main memory 230, and a CXL memory 240. Processor 210 includes a double data rate (DDR) memory controller 212, a CXL interface 214, and memory address decoding logic 220. DDR memory controller 212 represents a memory controller that is integrated into processor 210, and that operates in accordance with a particular DDR standard, such as a third generation DDR standard (DDR3), a fourth generation DDR standard (DDR4), a fifth generation DDR standard (DDR5), or a future DDR standard, as needed or desired. DDR memory controller 212 is connected system main memory 230 which includes dual in-line memory modules (DIMMs) 232, 234, 236, and 238. DIMMs 232, 234, 236, and 238 are provided in accordance with a common DDR standard with DDR memory controller 212. The details of the various DDR standards, and the interactions between DDR memory controllers and DDR DIMMs is known in the art, and will not be further described herein, except as may be needed to illustrate the current embodiments. CXL interface 214 is similar to PCIe PHY 115 as described above, and provides an interface to connect to CXL memory 240.

Memory address decoding logic 220 represents memory address decoding and routing logic instantiated on processor 210 that decodes the system physical address (SPA) and routes the memory request to the appropriate memory controller. Where information handling system 200 includes one or more processors similar to processor 210, memory address decoding logic 220 operates with the other processor to maintain the full SPA space of information handling system 200. Further, memory address decoding logic 220 maintains the SPA space of information handling system 200 with the memory interleaving as needed.

System main memory 230 is illustrated as including four (4) DIMMs 232, 234, 236, and 238, with two (2) DIMMs each on two separate memory channels. This configuration may be understood to be typical of memory architectures up to and including DDR4 memory architectures. Where DDR memory controller 212 and DIMMs 232, 234, 236, and 238 are provided in accordance with the DDR5 standard, each DIMM may include two (2) independent memory sub-channels. System main memory 230 is illustrated as being configured as a 4-way interleaved memory space, with successive cache lines of data being stored in adjacent DIMMs. System main memory 230 is illustrated as including a capacity of a number (M) of cache lines (CL(0)-CL(M−1)), where half of the capacity is given as a number (N) of cache lines (CL(0)-CL(N−1)).

More generally, while system main memory 230 is illustrated as including DIMMs 232, 234, 236, and 238, and as being provided in conjunction with DDR memory controller 212, the teachings of the current disclosure are not intended to be limited to DDR memory architectures, but are directed to any memory architecture that provides for memory interleaving, as described further below. Thus, the use of DDR elements in the current illustrations should be understood as being exemplary, and may also be representative of, for example, CXL memory architectures where data may be interleaved across CXL-attached memory elements such as CXL memory riser devices, CXL memory add-in devices, or the like.

CXL memory 240 represents a memory storage device connected to processor 210 by CXL interface 214, and represents a data storage device that utilizes one or more of the .CXL protocols to manage I/O, memory transactions, and memory caching. CXL memory 240 is included in the SPA space of information handling system 200. An example of CXL memory 240 may include a CXL memory riser or CXL memory add-in device, an expansion memory associated with a CXL accelerator, or the like. CXL memory 240 is illustrated as being a monolithic memory space, that is, the CXL memory is not illustrated as being an interleaved memory space. CXL memory 240 has a memory capacity at least equal to the sum of the memory capacities of DIMMs 232, 234, 236, and 238. However, the illustration of CXL memory 240 as a monolithic memory space is for ease of illustration, and a memory device configured to be utilized as described herein may represent a monolithic memory space, or an interleaved memory space across several memory devices, as needed or desired. More generally, CXL memory 240 may represent any type of memory device of information handling system 200, as needed or desired. However, the use of a CXL memory will provide particular advantages in the current embodiments.

In configuring information handling system 200, a system basic input/output system/universal extensible firmware interface (BIOS/UEFI) operates to set up the interleaving on system main memory 230, and, based upon the various .CXL protocols, the BIOS/UEFI further sets up one or more portions of the associated CXL memory, including CXL memory 240 to be interleaved memory, as needed or desired. The CXL memory may be interleaved with system main memory 230 in a common interleave domain, or the CXL memory may be interleaved in a separate interleave domain from the system main memory, as needed or desired. Further, it is envisioned that, as the CXL standards progress, such interleaving of system main memory 230 and CXL memory 240 may be provided throughout multiple memory tiers, such as where a particular CXL memory is accessed via one or more CXL switches. In a typical CXL information handling system, the BIOS/UEFI establishes the interleave domains over system main memory 230 and CXL memory 240 during a system boot phase of operation of information handling system 200, and such interleave domains are permanently fixed until such time as the information handling system is rebooted, at which time different interleave domains may be established, as needed or desired.

In a particular embodiment, information handling system 200 operates to redefine the interleave domains across system main memory 230 and CXL memory 240 during run time operations of the information handling system. Information handling system 200 operates to track system performance based upon existing interleave domains (for example the interleave domains set up by the system BIOS/UEFI at boot time), and to determine whether or not the performance of the information handling system could be improved by modifying or changing the interleave domains. Then, if modified or changed interleave domains could improve the performance of information handling system 200, the information handling system initiates a process to make the modifications or changes to the interleave domains during run time operation of the information handling system, without having to reboot the information handling system, and without having to halt processes or threads running on processor 210.

Information handling system 200 may make the determination as to whether or not to modify the interleave domains based upon various system performance metrics, including memory bandwidth on the various interleave domains, memory latencies of the various memories within the interleave domains, data access rates for the data stored within the interleave domains, or other material metrics for interleave domains as it relates to system performance, as needed or desired. In a particular embodiment, information handling system 200 utilizes a deterministic rules engine to make the determination as to whether or not to modify the interleave domains. For example, a rule may be employed that specifies that, if a bandwidth to a particular interleave domain drops below a threshold, then the interleave domain will be changed, or another rule may be employed as needed or desired. In another embodiment, information handling system 200 employs an artificial intelligence/machine learning (AI/ML) model for determining whether or not to modify the interleave domains. For example, information handling system 200 may include an artificial neural network (ANN) to learn the behaviors of the information handling system and predict an optimal configuration for the interleave domains, as needed or desired.

After information handling system 200 determines to modify the interleave domains, the information handling system invokes a process managed by memory address decoding logic 220 to de-interleave the memory elements from the original configuration (hereinafter the source memory element) and store the data to another memory element (hereinafter the temporary memory element), to reconfigure the memory elements to operate with the new configuration, and then to re-interleave the memory elements with the new interleave configuration. Typically such a process would necessitate a system reboot, or at least the halting of processes on the processor while the de-interleave/re-interleave process is ongoing. However, memory address decoding logic 220 redirects memory calls to the de-interleaved data as needed, in order to permit the processor to continue running processes and threads during the de-interleave/re-interleave process. In particular, information handling system 200 operates to select the temporary memory element (here CXL memory 240), and makes the SPA of the temporary memory element available to memory address decoding logic 220 prior to de-interleaving the source memory element. The SPA of the temporary memory element is used by memory address decoding logic 220 to redirect memory access requests during the de-interleave/re-interleave process, as described further below. Then, when the de-interleave/re-interleave process is completed, information handling system 200 operates to reclaim the temporary memory space back to a pooled resource for the information handling system. In this regard, the use of a CXL memory device may not be necessary, but it will be understood that the use of a CXL memory device may be advantageous as the temporary memory device, as a CXL memory device can be located outside of the node (information handling system 200), as needed or desired. Further, a CXM memory device can readily be assigned from a memory pool of CXL memory, utilized as the temporary memory device, and then freed back to the memory pool, as needed or desired. memory, used, and then freed up. In this way, the temporary memory device does not need to be a specific resource of information handling system 200, and it will be understood that, with respect to the CXL 2.0 specification and beyond, support of such memory pooling is enabled.

Moreover memory address decoding logic 220 performs the de-interleaving and re-interleaving opportunistically, when the memory controllers are otherwise idle, so as to not steal valuable processor cycles for the execution of the process. Then if a memory call comes to memory address decoding logic to access a region that is being accessed for the de-interleave/re-interleave process, memory address decoding logic 220 operates to complete the current memory access and then process the incoming memory call. In this way, only minor interruptions to the normal processing of information handling system 200 are experienced. Further, the run time de-interleave/re-interleave process may be utilized to support managed hot-add/remove/replace processes for memory elements of information handling system 200, as needed or desired.

Memory address decoding logic 220 include an interleave pointer 222 that points to a location (and address) in the source memory element that is currently being de-interleaved or re-interleaved, and a de-interleave/re-interleave state machine 224 that determines the cycle stealing, that moves the data (i.e., kicks off each cache line move and increments interleave pointer 222, and alerts information handling system 200 when the de-interleave/re-interleave process is completed. For example, in de-leaving a source memory element, memory address decoding logic 220 starts with interleave pointer 222 holding the address of the bottom of the source memory element. State machine 224 then reads the interleaved set of cache line data from the source memory location identified by interleave pointer 222, stores the data in the temporary memory element, and increments the interleave pointer to the next set of cache line data. This process is repeated until all of the user data stored in the source memory element are stored in the temporary memory element. Each round of reading and storing of interleaved sets of cache line data is an atomic process, and the completion of the entirety of the data transfer can be scheduled so as to provide a minimal amount of interruption to the normal processing on information handling system 200. In a particular embodiment, state machine 224 represents hardware logic instantiated in processor 210.

Likewise the re-interleaving process proceeds similarly, except here, the temporary memory element provides the data to be moved, and the data can be moved to any target memory element as determined by information handling system 200 in order to optimize the performance of the information handling system. Memory address decoding logic 220 starts with interleave pointer 222 holding the address of the bottom of the temporary memory element. State machine 224 then reads the interleaved set of cache line data from the temporary memory location identified by interleave pointer 222, stores the data in the target memory element with the newly configured interleave, and increments the interleave pointer to the next set of cache line data. Again, this process is repeated until all of the user data stored in the temporary memory element are stored in the target memory element.

The target memory element may be the same memory element as the source memory element, but configured with a new interleaving, or may be a different memory element from the source memory element, as needed or desired. Thus as illustrated in FIGS. 3A, 3B, 3C, and 3D, described below, the source memory element and the target memory element are illustrated as being system main memory 230, for simplicity of illustration. As described above, memory address decoding logic 220 operates from the bottom of the memory range of the source, temporary, and destination memory element. However memory address decoding logic 220 may operate from the top to the bottom of the associated address ranges as needed or desired.

Interleave pointer not only marks the progress of the de-interleave/re-interleave process, but also serves as a reference point for normal memory access operations by processor 210. When a memory access request from processor 210 is received by memory address decoding logic 220 for data stored in the memory space to be de-interleaved and re-interleaved, the memory address decoding logic utilized interleave pointer 222 as a reference to correctly direct the memory access request. For example, during the de-interleave process, the address of a memory access request to the source memory element is compared with interleave pointer 222. If the address is a lower address than is contained in de-interleave pointer 222, then the de-interleave process has already moved the data associated with the access request to the temporary memory element, and so memory address decoding logic 220 redirects the access request to the temporary memory element. On the other hand, if the address is a higher address than is contained in interleave pointer 222, then the de-interleave process has not moved the data associated with the access request to the temporary memory element, and so memory address decoding logic 220 directs the access request to the source memory element.

Similarly, during the re-interleave process, the address of a memory access request to the source memory element is compared with interleave pointer 222 (now pointing to an address of the temporary memory element). If the address is a lower address than is contained in interleave pointer 222, then the re-interleave process has already moved the data associated with the access request to the target memory element, and so memory address decoding logic 220 redirects the access request to the target memory element. On the other hand, if the address is a higher address than is contained in interleave pointer 222, then the re-interleave process has not moved the data associated with the access request to the target memory element, and so memory address decoding logic 220 directs the access request to the temporary memory element.

Figure 3A:
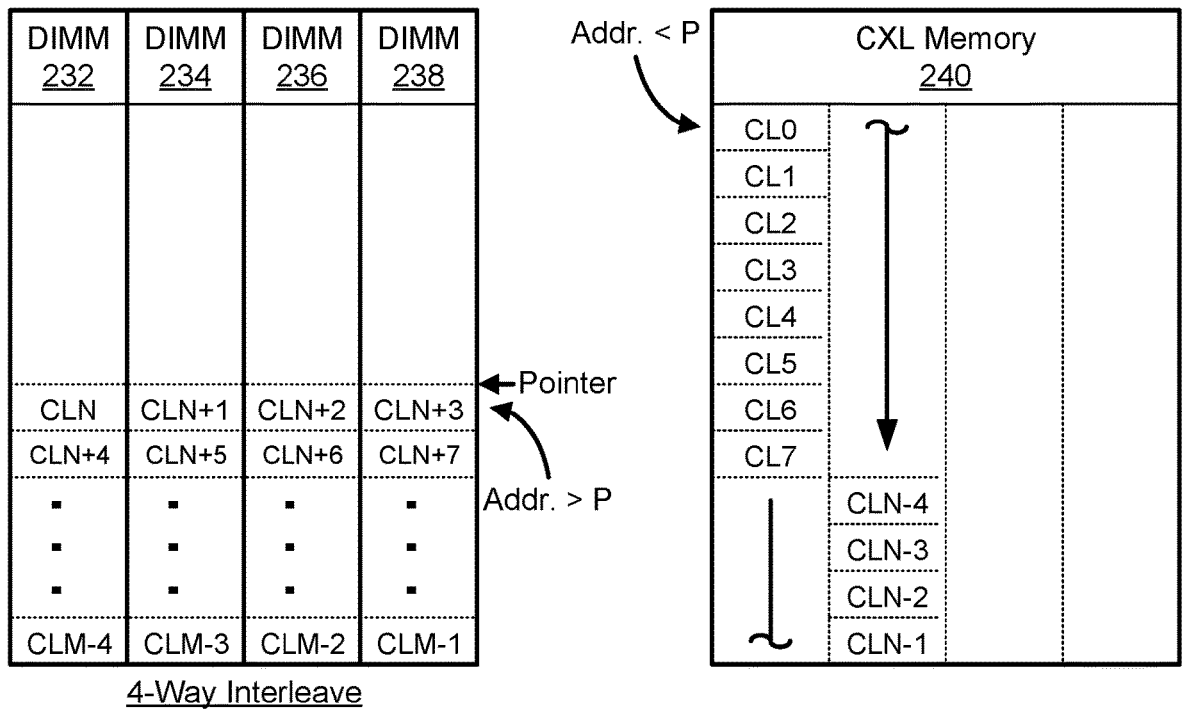
FIGS. 3A, 3B, 3C, and 3D illustrate a method for run time de-interleaving and re-interleaving of system memory in the CXL information handling system of FIG. 1.

FIGS. 3A. 3B, 3C, and 3D illustrate the de-interleave/re-interleave process. System main memory 230 represents the source memory element and also the target memory element, and CXL memory 240 represents the temporary memory element. Thus, CXL memory 240 will have a data storage capacity that is equal to or greater than the combined storage capacities of DIMMs 232, 234, 236, and 238. In FIG. 2, system main memory 230 is illustrated as including a capacity of a number (M) of cache lines (CL(0)-CL(M−1)), where half of the capacity is given as a number (N) of cache lines (CL(0)-CL(N−1)), and the system main memory is 4-way interleaved. Information handling system 200 is illustrated in an initial memory configuration, and CXL memory 240 is available for data storage as the temporary memory element. Information handling system 200 has determined that the interleave domain of system main memory 230 is not providing optimal performance, and has determined to reconfigure the system main memory as two (2) banks of 2-way interleaved memory.

Figure 3B:
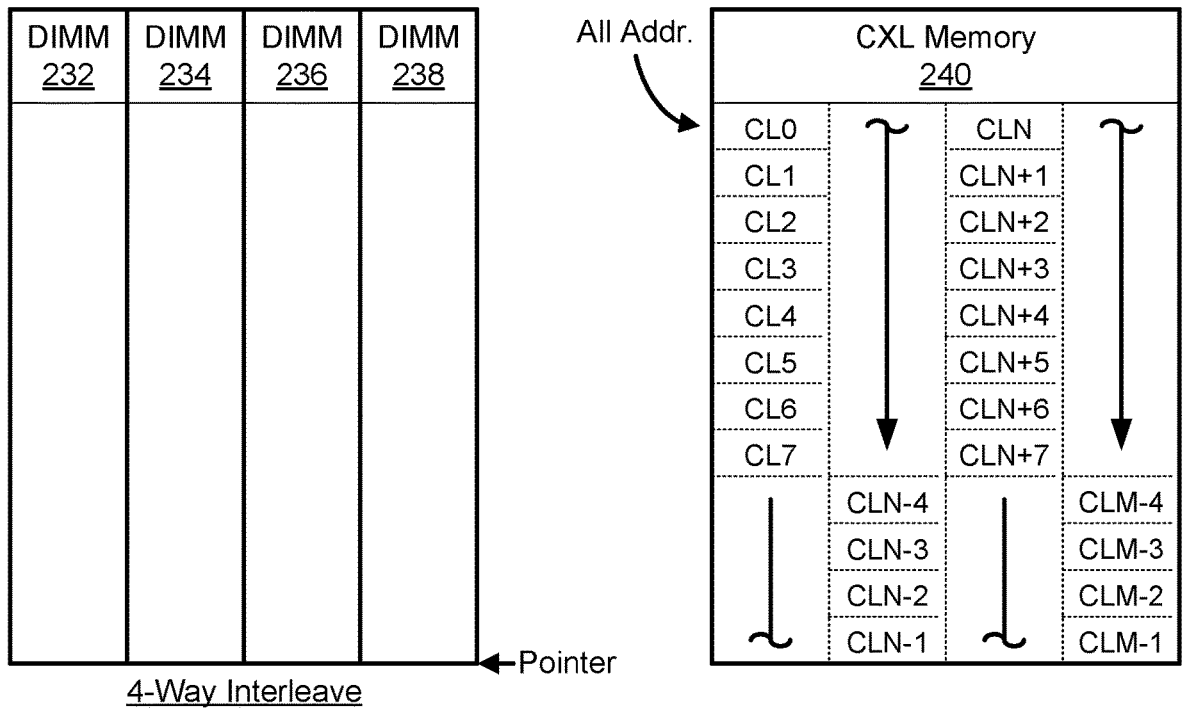

FIG. 3A illustrates a time after the de-interleave process has been half-way completed, with half of the cache lines (CL(0)-CL(N−1)) moved to CXL memory 240. Interleave pointer 222 is shown as including the address for cache line (CL(N)). As such, memory access requests with addresses lower than the address for cache line (CL(N)) will be redirected to CXL memory 240 as the temporary memory element, and memory access requests with addresses higher than the address for cache line (CL(N)) will be serviced by system main memory 230. In FIG. 3B, the de-interleave process has been completed, interleave pointer 222 has been incremented beyond the storage capacity of system main memory 230, and all memory access requests are serviced by CXL memory 240.

Figure 3C:
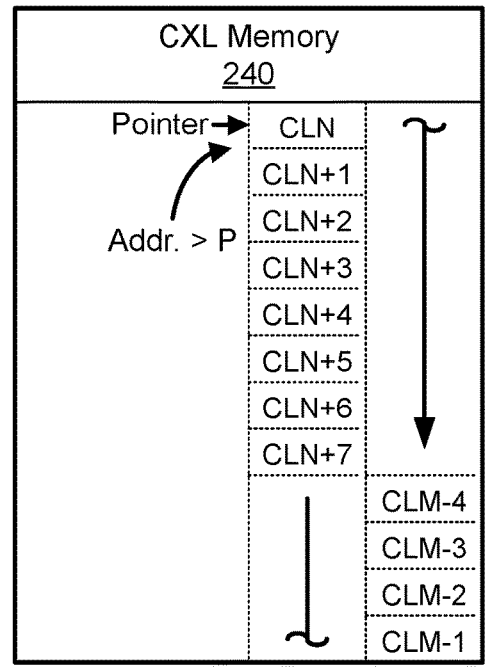
Figure 3D:

FIG. 3C illustrates a later time when the re-interleave process has been half-way completed, with half of the cache lines (CL(0)-CL(N−1)) moved to DIMMs 232 and 234 of system main memory 230. Interleave pointer 222 is shown as including the address for cache line (CL(N)) in CLX memory 240. As such, memory access requests with addresses lower than the address for cache line (CL(N)) will be serviced by DIMMs 232 and 234 of system main memory 230, and memory access requests with addresses higher than the address for cache line (CL(N)) will be serviced by CXL memory 240. In FIG. 3D, the re-interleave process has been completed, the other half of cache lines (CL(N)-CL(M−1)) have been move to DIMMs 236 and 238 of system main memory 230, and all memory access requests are serviced by the system main memory 240, thereby completing the de-interleave/re-interleave process.

Figure 4:
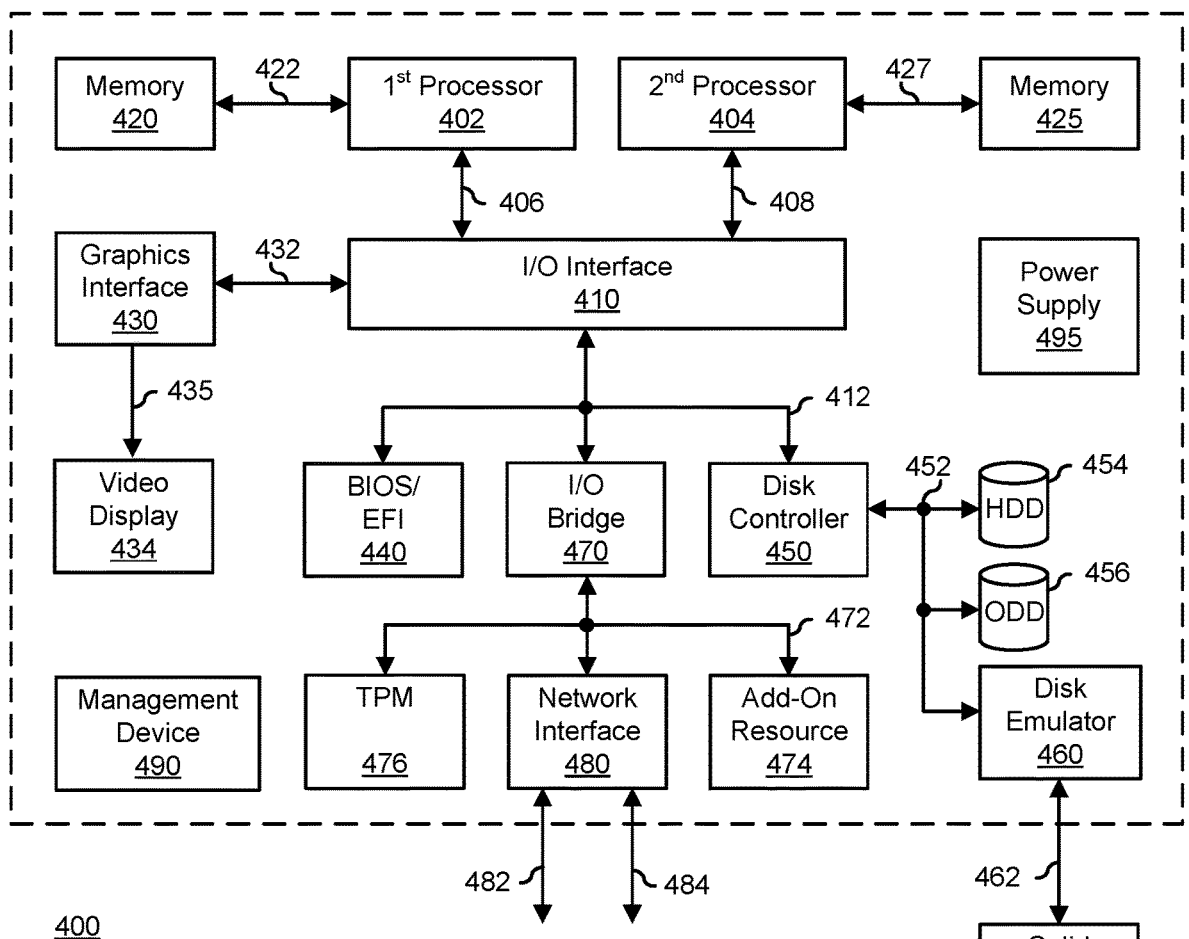
FIG. 4 is a block diagram illustrating a generalized information handling system according to another embodiment of the present disclosure.

FIG. 4 illustrates a generalized embodiment of an information handling system 400. For purpose of this disclosure an information handling system can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 400 can be a personal computer, a laptop computer, a smart phone, a tablet device or other consumer electronic device, a network server, a network storage device, a switch router or other network communication device, or any other suitable device and may vary in size, shape, performance, functionality, and price. Further, information handling system 400 can include processing resources for executing machine-executable code, such as a central processing unit (CPU), a programmable logic array (PLA), an embedded device such as a System-on-a-Chip (SoC), or other control logic hardware. Information handling system 400 can also include one or more computer-readable medium for storing machine-executable code, such as software or data. Additional components of information handling system 400 can include one or more storage devices that can store machine-executable code, one or more communications ports for communicating with external devices, and various input and output (I/O) devices, such as a keyboard, a mouse, and a video display. Information handling system 400 can also include one or more buses operable to transmit information between the various hardware components.

Information handling system 400 can include devices or modules that embody one or more of the devices or modules described below, and operates to perform one or more of the methods described below. Information handling system 400 includes a processors 402 and 404, an input/output (I/O) interface 410, memories 420 and 425, a graphics interface 430, a basic input and output system/universal extensible firmware interface (BIOS/UEFI) module 440, a disk controller 450, a hard disk drive (HDD) 454, an optical disk drive (ODD) 456, a disk emulator 460 connected to an external solid state drive (SSD) 462, an I/O bridge 470, one or more add-on resources 474, a trusted platform module (TPM) 476, a network interface 480, a management device 490, and a power supply 495. Processors 402 and 404, I/O interface 410, memory 420 and 425, graphics interface 430, BIOS/UEFI module 440, disk controller 450, HDD 454, ODD 456, disk emulator 460, SSD 462, I/O bridge 470, add-on resources 474, TPM 476, and network interface 480 operate together to provide a host environment of information handling system 400 that operates to provide the data processing functionality of the information handling system. The host environment operates to execute machine-executable code, including platform BIOS/UEFI code, device firmware, operating system code, applications, programs, and the like, to perform the data processing tasks associated with information handling system 400.

In the host environment, processor 402 is connected to I/O interface 410 via processor interface 406, and processor 404 is connected to the I/O interface via processor interface 408. Memory 420 is connected to processor 402 via a memory interface 422. Memory 425 is connected to processor 404 via a memory interface 427. Graphics interface 430 is connected to I/O interface 410 via a graphics interface 432, and provides a video display output 435 to a video display 434. In a particular embodiment, information handling system 400 includes separate memories that are dedicated to each of processors 402 and 404 via separate memory interfaces. An example of memories 420 and 430 include random access memory (RAM) such as static RAM (SRAM), dynamic RAM (DRAM), non-volatile RAM (NV-RAM), or the like, read only memory (ROM), another type of memory, or a combination thereof.

BIOS/UEFI module 440, disk controller 450, and I/O bridge 470 are connected to I/O interface 410 via an I/O channel 412. An example of I/O channel 412 includes a Peripheral Component Interconnect (PCI) interface, a PCI-Extended (PCI-X) interface, a high-speed PCI-Express (PCIe) interface, another industry standard or proprietary communication interface, or a combination thereof. I/O interface 410 can also include one or more other I/O interfaces, including an Industry Standard Architecture (ISA) interface, a Small Computer Serial Interface (SCSI) interface, an Inter-Integrated Circuit ($I^2C$) interface, a System Packet Interface (SPI), a Universal Serial Bus (USB), another interface, or a combination thereof. BIOS/UEFI module 440 includes BIOS/UEFI code operable to detect resources within information handling system 400, to provide drivers for the resources, initialize the resources, and access the resources. BIOS/UEFI module 440 includes code that operates to detect resources within information handling system 400, to provide drivers for the resources, to initialize the resources, and to access the resources.

Disk controller 450 includes a disk interface 452 that connects the disk controller to HDD 454, to ODD 456, and to disk emulator 460. An example of disk interface 452 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 460 permits SSD 464 to be connected to information handling system 400 via an external interface 462. An example of external interface 462 includes a USB interface, an IEEE 1394 (Firewire) interface, a proprietary interface, or a combination thereof. Alternatively, solid-state drive 464 can be disposed within information handling system 400.

I/O bridge 470 includes a peripheral interface 472 that connects the I/O bridge to add-on resource 474, to TPM 476, and to network interface 480. Peripheral interface 472 can be the same type of interface as I/O channel 412, or can be a different type of interface. As such, I/O bridge 470 extends the capacity of I/O channel 412 when peripheral interface 472 and the I/O channel are of the same type, and the I/O bridge translates information from a format suitable to the I/O channel to a format suitable to the peripheral channel 472 when they are of a different type. Add-on resource 474 can include a data storage system, an additional graphics interface, a network interface card (NIC), a sound/video processing card, another add-on resource, or a combination thereof. Add-on resource 474 can be on a main circuit board, on separate circuit board or add-in card disposed within information handling system 400, a device that is external to the information handling system, or a combination thereof.

Network interface 480 represents a NIC disposed within information handling system 400, on a main circuit board of the information handling system, integrated onto another component such as I/O interface 410, in another suitable location, or a combination thereof. Network interface device 480 includes network channels 482 and 484 that provide interfaces to devices that are external to information handling system 400. In a particular embodiment, network channels 482 and 484 are of a different type than peripheral channel 472 and network interface 480 translates information from a format suitable to the peripheral channel to a format suitable to external devices. An example of network channels 482 and 484 includes InfiniBand channels, Fibre Channel channels, Gigabit Ethernet channels, proprietary channel architectures, or a combination thereof. Network channels 482 and 484 can be connected to external network resources (not illustrated). The network resource can include another information handling system, a data storage system, another network, a grid management system, another suitable resource, or a combination thereof.

Management device 490 represents one or more processing devices, such as a dedicated baseboard management controller (BMC) System-on-a-Chip (SoC) device, one or more associated memory devices, one or more network interface devices, a complex programmable logic device (CPLD), and the like, that operate together to provide the management environment for information handling system 400. In particular, management device 490 is connected to various components of the host environment via various internal communication interfaces, such as a Low Pin Count (LPC) interface, an Inter-Integrated-Circuit (I2C) interface, a PCIe interface, or the like, to provide an out-of-band (OOB) mechanism to retrieve information related to the operation of the host environment, to provide BIOS/UEFI or system firmware updates, to manage non-processing components of information handling system 400, such as system cooling fans and power supplies. Management device 490 can include a network connection to an external management system, and the management device can communicate with the management system to report status information for information handling system 400, to receive BIOS/UEFI or system firmware updates, or to perform other task for managing and controlling the operation of information handling system 400. Management device 490 can operate off of a separate power plane from the components of the host environment so that the management device receives power to manage information handling system 400 when the information handling system is otherwise shut down. An example of management device 490 include a commercially available BMC product or other device that operates in accordance with an Intelligent Platform Management Initiative (IPMI) specification, a Web Services Management (WSMan) interface, a Redfish Application Programming Interface (API), another Distributed Management Task Force (DMTF), or other management standard, and can include an Integrated Dell Remote Access Controller (iDRAC), an Embedded Controller (EC), or the like. Management device 490 may further include associated memory devices, logic devices, security devices, or the like, as needed or desired.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. An information handling system, comprising:
   a processor;
   a first memory device coupled to the processor and that provides a first system physical address (SPA) space for the information handling system, wherein data is stored on the first memory device with a first interleave configuration; and
   a second memory device coupled to the processor and that provides a second SPA space for the information handling system;
   wherein the processor is configured to determine whether or not to modify the first interleave configuration based upon a system performance of the information handling system, and, when the processor determines to modify the first interleave configuration, to de-interleave the data stored on the first memory device, to store the data on the second memory device, and to re-interleave the data, without rebooting the information handling system and without halting a process on the processor.

2. The information handling system of claim 1, wherein in re-interleaving the data, the processor is further configured to re-interleave the data onto the first memory device with a second interleave configuration different from the first interleave configuration.

3. The information handling system of claim 2, wherein the processor includes an interleave pointer to store a memory address.

4. The information handling system of claim 3, wherein, in de-interleaving the data, the processor is further configured to store a first address within the first SPA space in the interleave pointer.

5. The information handling system of claim 4, wherein, in de-interleaving the data, the processor is further configured to retrieve first interleaved data from the first memory device from the first address based upon the interleave pointer, to store the first interleaved data on the second memory device, and to increment the interleave pointer to a second address of second interleaved data of the first memory device.

6. The information handling system of claim 4, wherein while the processor is de-interleaving the data stored on the first memory device, the processor is further configured to provide a memory access request to a third address within the first SPA space, to determine whether the third address is higher than the first address or lower than the first address, to direct the memory access request to the first memory device when the third address is higher than the first address, and to direct the memory access request to the second memory device when the third address is lower than the first address.

7. The information handling system of claim 3, wherein, in re-interleaving the data, the processor is further configured to store a first address within the second SPA space in the interleave pointer.

8. The information handling system of claim 7, wherein, in re-interleaving the data, the processor is further configured to retrieve first data from the second memory device from the first address based upon the interleave pointer, to re-interleave the first data on the first memory device, and to increment the interleave pointer to a second address of second data of the second memory device.

9. The information handling system of claim 8, wherein, while the processor is re-interleaving the data stored on the first memory device, the processor is further configured to provide a memory access request to a third address within the first SPA space, to determine whether the third address is higher than the first address or lower than the first address, to direct the memory access request to the second memory device when the third address is higher than the first address, and to direct the memory access request to the first memory device when the third address is lower than the first address.

10. A method, comprising:
storing, on a first memory device of an information handling system coupled to a processor of the information handling system, data with a first interleave configuration, wherein the first memory device provides a first system physical address (SPA) space for the information handling system;
determining whether or not to modify the first interleave configuration based upon a system performance of the information handling system;
in response to determining to modify the first interleave configuration, without rebooting the information handling system and without halting a process on the processor:
de-interleaving the data stored on the first memory device;
storing, on a second memory device of the information handling system coupled to the processor, the data, wherein the second memory device
provides a second SPA space for the information handling system; and
re-interleaving the data.

11. The method of claim 10, wherein, in re-interleaving the data, the method further comprises re-interleaving the data onto the first memory device with a second interleave configuration different from the first interleave configuration.

12. The method of claim 11, wherein the processor includes an interleave pointer to store a memory addresses.

13. The method of claim 12, wherein, in de-interleaving the data, the method further comprises:
storing a first address within the first SPA space in the interleave pointer.

14. The method of claim 13, wherein, in de-interleaving the data, the method further comprises:
retrieving first interleaved data from the first memory device from the first address based upon the interleave pointer;
storing the first interleaved data on the second memory device; and
incrementing the interleave pointer a second address of second interleaved data of the first memory device.

15. The method of claim 13, wherein, while the processor is de-interleaving the data stored on the first memory device, the method further comprises:
providing, by the processor, a memory access request to a third address within the first SPA space;
determining whether the third address is higher than the first address or lower than the first address;
directing the memory access request to the first memory device when the third address is higher than the first address; and
directing the memory access request to the second memory device when the third address is lower than the first address.

16. The method of claim 12, wherein, in re-interleaving the data, the processor is further configured to store a first address within the second SPA space.

17. The method of claim 16, wherein, in re-interleaving the data, the method further comprises:
retrieving first data from the second memory device from the first address based upon the interleave pointer
re-interleaving the first data on the first memory device; and
incrementing the interleave pointer a second address of second data of the second memory device.

18. The method of claim 17, wherein, while the processor is re-interleaving the data stored on the first memory device, the method further comprises:
providing, by the processor, a memory access request to a third address within the first SPA space;
determining whether the third address is higher than the first address or lower than the first address;
directing the memory access request to the second memory device when the third address is higher than the first address; and
directing the memory access request to the first memory device when the third address is lower than the first address.

19. An information handling system, comprising:
a first memory device coupled to a processor and that provides a first system physical address (SPA) space for the information handling system, wherein data is stored on the first memory device with a first interleave configuration;
a second memory device that provides a second SPA space for the information handling system;
a third memory device that provides a third SPA space for the information handling system;
wherein the processor is configured to determine whether or not to modify the first interleave configuration based upon a system performance of the information handling system, and, when the processor determines to modify the first interleave configuration, to de-interleave the data stored on the first memory device, to store the data on the second memory device, and to re-interleave the data onto the third memory device with a second interleave configuration, without rebooting the information handling system and without halting a process on the processor.

20. The information handling system of claim 19, wherein in re-interleaving the data, the processor is further configured to re-interleave the data onto the third memory device with a second interleave configuration different from the first interleave configuration.

* * * * *